United States Patent
Mikami

Patent Number: 5,556,160
Date of Patent: Sep. 17, 1996

[54] SEAT WITH USER PROTECTING MEANS

[76] Inventor: Tatuya Mikami, Crest Suehiro 302, 2-13-20, Suehiro, Ichikawa-shi, Chiba-ken, Japan

[21] Appl. No.: 317,873

[22] Filed: Oct. 4, 1994

[51] Int. Cl.$^6$ ...................................................... B60N 2/42
[52] U.S. Cl. ............................................ 297/216.1; 297/313
[58] Field of Search ................................ 297/216.1, 330, 297/339, 337, 313, 316–318, 216.15, 216.16, 216.19, 216.2, 325, 329, 344.1; 296/68.1

[56] References Cited

U.S. PATENT DOCUMENTS

| | | | |
|---|---|---|---|
| 2,102,979 | 12/1937 | Smith | 297/216.19 |
| 2,736,566 | 2/1956 | Hartl | 297/216.1 X |
| 2,942,647 | 6/1960 | Pickles | 297/330 X |
| 3,173,720 | 3/1965 | Nada | 297/330 X |
| 3,610,679 | 10/1971 | Amato | 297/216.16 |
| 3,731,972 | 5/1973 | McConnell | 297/216.19 |
| 3,858,930 | 1/1975 | Calandra et al. | 297/216.19 X |
| 3,998,291 | 12/1976 | Davis | 297/216.19 X |
| 5,244,252 | 9/1993 | Serber | 297/216.19 |

*Primary Examiner*—Milton Nelson, Jr.
*Attorney, Agent, or Firm*—Nixon & Vanderhye

[57] ABSTRACT

A seat with a user protecting device, includes a leg member, a backrest member attached to the leg member so as to extend upward therefrom, a seat member attached to the leg member so as to be between a seating position in which the seat member is arranged substantially horizontally and an inclined position in which at least a rear end portion of the seat member located on a back rest side of the leg member is arranged below the seating position or a front end portion of the seat member located opposite to the rear end portion thereof is arranged above the seating position, and a seat member rotation mechanism for holding the seat member in the seating position and allowing the seat member to rotate selectively from the seating position to the inclined position.

4 Claims, 1 Drawing Sheet

SEAT WITH USER PROTECTING MEANS

BACKGROUND OF THE INVENTION

1. Field of the Invention

The present invention relates to a seat with user protecting means.

2. Description of the Related Art

Modern seats which are set in transportation means, especially those seats which are set in automobiles and airplanes, are provided with seat belts which restrain parts of human bodies on the seats. The seat belts can prevent the seated person from being seriously wounded by being flung against something in front of them, e.g., the windshields or steering wheels of the automobiles, next seats located ahead of the seated person in the automobiles or airplanes, or bulkheads in the airplanes, or by falling off their seats to a floor, when the transportation means are subjected to impact forces in accidents or the like. That is, the seat belts serve as user protecting means. A conventional seat belt restrains at least a portion of a seated person's body which corresponds to its hipbone to a seat. The reason why this is that the hipbone is the strongest part of the human body. If the person on the seat is not seated in an appropriate posture or has body dimensions which is out of a predetermined range, however, this conventional seat belt may restrain some inappropriate portion of the person's body which does not corresponds to the hipbone. If an impact force is applied to the transportation means in an accident or the like in this case, internal organs of the above described seated person may be injured seriously, especially between the hipbone and the ribs. Besides, many persons dislike to use seat belts.

SUMMARY OF THE INVENTION

The present invention has been contrived in consideration of these circumstances, and its object is to provide a seat with user protecting means, which can prevent a human body on the seat, when an impact force acts on transportation means in an accident or the like, from being flung forward by the force of inertia and from being injured seriously even if the person on the seat seated in an unappropriate posture or has body dimensions which is out of a predetermined range, and which, unlike seat belts, does not need to a trouble some wearing operation.

In order to achieve the above object, a seat with user protecting means according to the present invention comprises: a leg member; a backrest member attached to the leg member so as to extend upward therefrom; a seat member attached to the leg member so as to be rotatable between a seating position in which the seat member is arranged in substantially horizontally and an inclined position in which at least a rear end portion of the seat member located on the back rest side of the leg member is arranged below the seating position or a front end portion of the seat member located opposite to the rear end portion thereof is arranged above the seating portion; and seat member rotation means for holding the seat member in the seating position and allowing the seat member to rotate selectively from the seating position to the inclined position.

According to the seat with user protecting means of this invention, if it is foreseen immediately before an accident or the like, for example, that transportation means carrying the seat will be subjected to an impact force, the seat member rotation means can be actuated so as to allow the seat member to be rotated from the seating position to the inclined position by direct manual operation or manual operation through a power drive unit before the impact force actually acts on the transportation means. Even immediately after an impact force is actually applied to the transportation means in an accident or the like, moreover, the seat portion rotation means can be actuated by the force of inertia produced in the seat member by the impact force.

If the seat member rotates from the seating position to the inclined position before a seated person's body is flung forward by the force of inertia as the impact force acts on the transportation means, the loins of the seated person, located at the rear end portion of the seat member, moves downward together with the rear end portion of the seat member and locates below the knees of the seated person.

In this state, the force of inertia which urges the seated person's body to be flung forward is transmitted to a whole of an upper surface of the seat member in the inclined position through a lower end of the hipbone and the thighs of the seated person, and is received by the whole of the upper surface of the seat member. Thus, the seated person can be prevented from being flung away forward by the force of inertia and from being wounded on its internal organs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

DETAILED DESCRIPTION OF THE PREFERRED EMBODIMENTS

Various embodiments of a seat with user protecting means according to the present invention will now be described in detail with reference to the accompanying drawings.

[First Embodiment]

Figure 1:
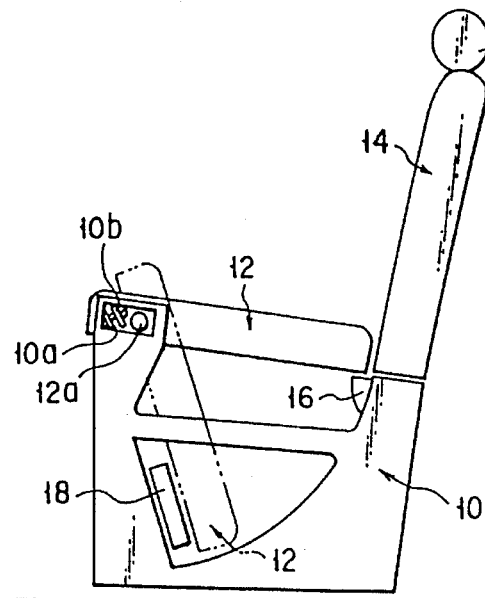
FIG. 1 is a schematic side view showing a first embodiment of a seat with user protecting means according to the present invention.

As shown in FIG. 1, a first embodiment of the seat with user protecting means according to the present invention comprises, for example, a leg member 10 fixed to a floor of a transportation means, such as an automobile, train, airplane, or ship, a seat member 12 located on an upper surface of the leg member 10 and used to support buttocks of a person seated on the seat member 12, and a backrest member 14 attached to one end portion (hereinafter referred to as a rear end portion) of the upper surface of the leg member 10 so as to project upward and used to support a back of the seated person. A headrest 14a is attached to an upper end of the backrest member 14. In this embodiment, a rotational center shaft 12a is fixed to an end portion (front end portion) of the seat member 12 on the other end side (hereinafter referred to as a front end portion) of the upper surface of the leg member 10 so as to project horizontally from both right and left sides of the seat member 12. Both end portions of the shaft 12a are supported by means of a pair of bearings 10a arranged at the front end portion of the upper surface of the leg member 10 so that the bearings 10a are separated from each other in right and left directions of the leg member 10, so as to be rotatable and movable back and forth for a predetermined distance. Thus, the combination of the rotational center shaft 12a and the pair of bearings 10a constitutes rotational supporting means for supporting the seat member 12 so that the seat member 12 can be rotatable and movable in back and forth directions of the seat with respect to the leg member 10. Each bearing 10a contains rearward urging means 10b, e.g., a compression coil spring, which urges a corresponding end portion of the shaft 12a rearward. The seat member 12 is rotatable around the shaft 12a between a substantially horizontal seating position, indicated by a solid line in FIG. 1, and an inclined position in which the rear end portion of the seat member 12 is located below the seating position, as indicated by a two-dot chain line in FIG. 1. An engaging claw 16 is attached to the rear end portion of the upper surface of the leg member 10. The claw 16 constitutes seating position retaining means, which is adapted to engage the rear end portion of the seat member 12 in the seating position, thereby preventing the seat member 12 in the seating position from rotating to the inclined position. The claw 16 has a substantially triangular cross member, including a substantially horizontal upper surface, on which the rear end portion of the seat member 12 is placed, and an inclined front surface which inclines rearward from a front end of the upper surface in a lower side thereof. The engaging claw 16 is movable between an engaging position at which the claw 16 projects as shown in FIG. 1 and a retracted position in which the claw 16 is retracted into the leg member 10. The claw 16 is urged toward the engaging position by urging means (not shown). Attached to the leg member 10 is a shock absorber 18 which and abuts a lower surface of the rear end portion of the seat member 12 when the seat member 12 rotates from the seating position to the inclined position and absorbs movement energy of the seat member 12, thereby damping an impact force produced in the seat member 12.

According to the first embodiment arranged in this manner, if the transportation means to which the seat is fixed is subjected to an impact force from a front side of the transportation means for example in an accident or the like after a person is seated thereon, the seat member 12, along with the seated person, is moved forward by the force of inertia against the urging force of the rearward urging means 10b of the pair of bearings 10a. Thereupon, the rear end portion of the seat member 12 is disengaged from the engaging claw 16. As a result, the seat member 12, along with the person thereon, is rotated from the seating position to the inclined position by its own weight and the seated person's weight, abuts against the shock absorber 18, and stops at the inclined position. Thus, the shaft 12a of the seat member 12, pair of bearings 10a, rearward urging means 10b, and engaging claw 16 constitute seat member rotation means which holds the seat member 12 in the seating position and allows it to rotate selectively from the seating position to the inclined position. Preferably, in this embodiment, a center of rotation of the seat member 12 in the rotational supporting means constituted by the combination of the shaft 12a and the pair of bearings 10a should be located as close to the front end portion of the seat member 12 as possible.

Before the seated person is flung forward by the force of inertia as the impact force acts on the transportation means, the seat member 12 rotates from the seating position to the inclined position, so that the loins of the seated person, located at the rear end portion of the seat member 12, moves downward together with the rear end portion of the seat member 12 and locates below the knees of the seated person. In this state, the force of inertia which urges the seated person to be flung forward is transmitted to the upper surface of the seat member 12 in the inclined position through the lower end of the hipbone and the thighs of the seated person, and is received by the seat member 12 and the shock absorber 18. Thus, the seated person can be prevented from being flung forward by the force of inertia and from being wounded on the internal organs.

The same functions as aforesaid can be achieved if both end portions of the shaft 12a are fixed to the leg member 10 and the bearings 10a with the rearward urging means 10b are fixed to the seat member 12. In this case, the rearward urging means 10b of the bearings 10a, unlike the one embodiment shown in FIG. 1, is located behind the shaft 12a. Moreover, the shaft 12a on the seat member 12 may be located closer to a central position between the front and rear end portions of the seat member 12 than in the case of FIG. 1.

The seat member 12 moved to the inclined position can be moved to the seating position by lifting up its rear end portion to abut against the inclined front surface of the engaging claw 16 so that the claw 16 moves to the retracted position, resisting the urging force of the urging means (not shown).

[Second Embodiment]

A second embodiment comprises the same basic components as those of the first embodiment, that is the leg member 10, seat member 12, and backrest member 14, and besides, the same shock absorber 18. Therefore, a detailed description of these components is omitted. The second embodiment differs from the first embodiment in a configuration of the seat member rotation means which holds the seat member 12 in the seating position and allows the seat member 12 to rotate selectively from the seating position to the inclined position.

Figure 2:
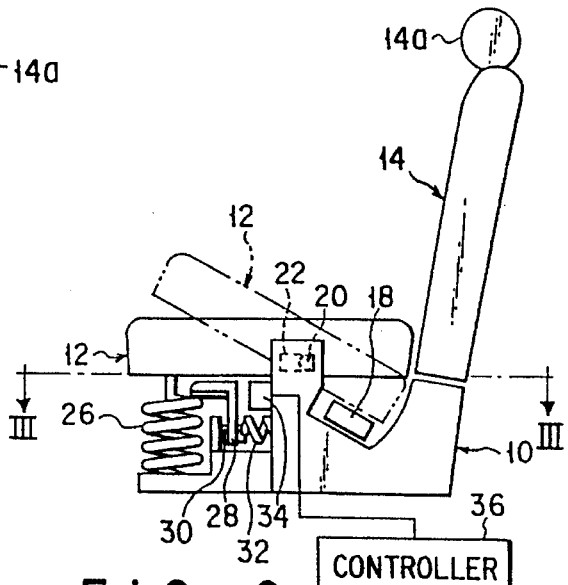
FIG. 2 is a schematic side view showing a second embodiment of the seat with user protecting means according to the invention.
Figure 3:
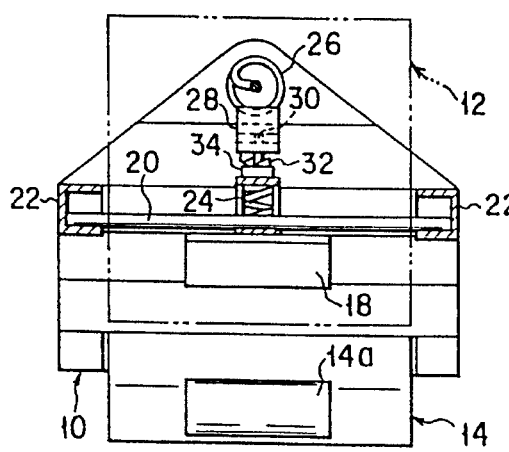
FIG. 3 is a schematic plan view showing the seat of FIG. 2 with its seat member being removed.

In this embodiment, as shown in FIGS. 2 and 3, a rotational center shaft 20 of the seat member 12 extends horizontally in a substantially middle position of the seat member 12 in its longitudinal direction, and both end portions of the shaft 20 project from both right and left side surfaces of the seat member 12 of the seat member 12. The both end portions of the shaft 20 are supported by means of a pair of bearings 22 arranged at the substantially middle position on the upper surface of the leg member 10 in the back and forth directions of the leg member 10 so that the bearings 22 are separated from each other in the right and left directions of the leg member 10, thereby the shaft 20 being rotatable and movable back and forth for a predetermined distance. Thus, the combination of the shaft 20 and the pair of bearings 22 constitutes rotational supporting means for supporting the seat member 12 so that the seat member 12 can rotate and move in the back and forth directions of the seat with respect to the leg member 10. Also, a center portion of the shaft 20 in its right and left directions, is urged rearward by means of rearward urging means 24, e.g., a compression coil spring, which is located at a position on the upper surface of the leg member 10, the position corresponding to the center portion of the shaft 20. The seat member 12 is rotatable around the shaft 20 between a substantially horizontal seating position, indicated by a solid line in FIG. 2, and an inclined position at which its rear end portion is located below the seating position and its front end portion is located above the seating position, as indicated by a two-dot chain line in FIG. 2. Rotational urging means 26, e.g., a compression coil spring, is interposed between the front end portion of the upper surface of the leg member 10 and the front end portion of the lower surface of the seat member 12. The urging means 26 urges the seat member 12 from the seating position toward the inclined position. Moreover, an engaging member 28, which is movable for a predetermined distance in back and fourth directions of the leg member 10, is located rearwardly adjacent to the urging means 26 on the upper surface of the leg member 10. A movement of the engaging member 28 is guided by means of a guide rod 30 which is attached to the upper surface of the leg member 10 and extends in the back and forth directions. When in its advanced position, as shown in FIGS. 2 and 3, the engaging member 28 engages the rotational urging means 26, thereby preventing the seat member 12 from rotating from the seating position to the inclined position by the urging force of the urging means 26. When in its retreated position, the engaging member 28 is disengaged from the urging means 26, thereby allowing the seat member 12 to rotate from the seating position to the inclined position by the urging force of the rotational urging means 26. Thus, the advanced and retreated positions of the engaging member 28 are a rotation preventing position and a rotation allowing position, respectively. The member 28 is urged toward the advanced position or rotation preventing position by means of urging means 32, e.g., a compression coil spring. Alternatively, the engaging member 28 may be designed so as to engage a position of the seat member 12 which is located ahead of the shaft 20, when in the rotation preventing position. In this embodiment, at least a part of the engaging member 28 is formed of a magnetic material, and an electromagnet 34 is located behind the engaging member 28. The electromagnet 34 is fixed on the upper surface of the leg member 10 and is selectively excited by means of a controller 36. An excitation switch of the controller 36 can be attached to each seat or set in a crew room of a transportation means. Alternatively, the excitation switch may be combined with an accelerometer so that it can be turned on when a deceleration higher than a predetermined value is detected by means of the accelerometer.

According to the second embodiment arranged in this manner, the engaging member 28 located in the rotation preventing position, as shown in FIGS. 2 and 3, constitutes seating position retaining means, which engages with the rotational urging means 26 to prevent the seat member 12 from rotating from the seating position to the inclined position by the urging force of the urging means 26, while the seat member 12 is located in the seating position. If the transportation means to which the seat of the second embodiment is fixed is subjected to an impact force from a front side of the transportation means, for example in an accident or the like, the seat member 12, along with the seated person, is moved forward by the force of inertia against the urging force of the rearward urging means 32. Thereupon, the engaging member 28 is disengaged from the rotational urging means 26. As a result, the seat member 12, along with the seated person thereon, is rotated from the seating position to the inclined position by the urging force of the urging means 26 and the seated person's weight, abuts against the shock absorber 18, and stops at the inclined position. Thus, the shaft 20 of the seat member 12, pair of bearings 22, rearward urging means 24, and engaging member 28 constitute seat member rotation means which holds the seat member 12 in the seating position and allows it to rotate selectively from the seating position to the inclined position.

Before the seated person's body is flung forward by the force of inertia as the impact force acts on the transportation means, the seat member 12 rotates from the seating position to the inclined position, so that the loins of the seated person, located at the rear end portion of the seat member 12, moves downward together with the rear end portion of the seat member 12 to be situated below the knees of the seated person. This provides the same advantages as those produced by the first embodiment. In the case of the second embodiment, however, the rotational movement of the seat member 12 from the seating position to the inclined position is forced by means of the rotational urging means 26. In consequence, the rotational movement of the seat member 12 from the seating position to the inclined position can be speeded up without being substantially influenced by the seated person's weight, and besides, reliability of the rotational movement can be promoted.

In the case the excitation switch of the controller 36 of the electromagnet 34 is combined with the accelerometer, the switch is turned on to excite the electromagnet 34 when the impact force acts on the transportation means and a deceleration higher than a predetermined value is detected by means of the accelerometer. Accordingly, the engaging member 28 is attracted to the electromagnet 34 and is moved to the rotation allowing position against the urging force of the urging means 32, whereupon the seat member 12 is rotated from the seating position to the inclined position by means of the urging force of the rotational urging means 26. Thus, the second embodiment can secure the same advantages as those of the first embodiment, the improved speed of rotation movement of the seat member 12 from the seating position to the inclined position without the influence of the seated person's weight, and the reliability of the rotation movement of the seat member 12.

If it is foreseen that the transportation means will be subjected to an impact force from the front side thereof, for example in an accident or the like, the seated person on each seat or a crew in the crew room of the transportation means can turn on the excitation switch of the controller 36 of the electromagnet 34, thereby causing the seat member 12 to rotate forcibly from the seating position to the inclined position by the urging force of the rotational urging means 26.

In this embodiment, the electromagnet 34 and the urging means of the engaging member 28 constitute engaging member selective moving means for selectively moving the member 28 from the rotation preventing position to the rotation allowing position. Alternatively, however, the engaging member selective moving means may be composed of a hydraulic or pneumatic piston-cylinder assembly both ends of which are fixed to the engaging member 28 and the surface of the leg member 10, or drive means, such as an airbag, which utilizes explosion of explosive. Also in this embodiment, the same functions as aforesaid in the first embodiment can be achieved if both end portions of the shaft 20 are fixed to the leg member 10 and the rearward urging means 24 is fixed to the seat member 12. In this case, the rearward urging means 24, unlike the one shown in FIG. 1, is located behind the shaft 20.

This embodiment, in which the seat member 12 is rotated surely for a very few time from the seating position to the inclined position by the urging force of the urging means 26, is specially preferably in that a distance between the seated person and an obstacle, for example a hande or the like, in front of the seated person is relatively short.

[Third Embodiment]

The third embodiment also comprises the same basic components as those of the first embodiment, that is the leg member 10, seat member 12, and backrest member 14, and besides, the same shock absorber 18. Therefore, a detailed description of these components is omitted. The third embodiment differs from the first and second embodiments in the configuration of the seat member rotation means which holds the seat member 12 in the seating position and allows the seat member 12 to rotate selectively from the seating position to the inclined position.

Figure 4:
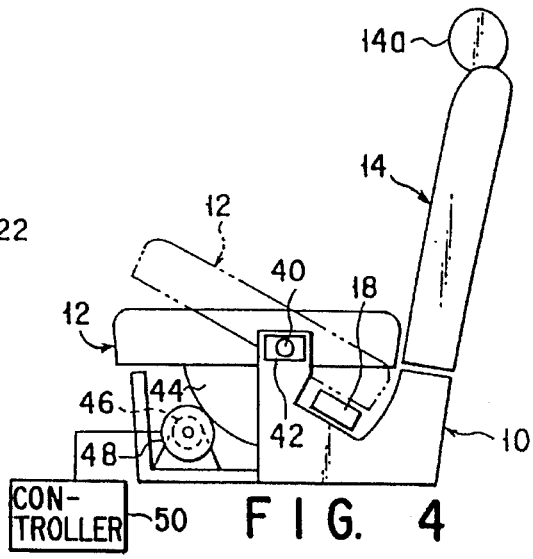
FIG. 4 is a schematic side view showing a third embodiment of the seat with user protecting means according to the invention.

In this embodiment, as shown in FIG. 4, a rotational shaft 40 of the seat member 12 horizontally extends in the substantially middle position of the seat member 12 in the back and forth directions of the seat member 12, and both end portions of the shaft 40 project from the right and left side surfaces of the seat member 12. The both end portions of the shaft 40 are supported for rotation individually by means of a pair of bearings 42 located at the substantially middle position on the upper surface of the leg member 10 in the back and forth directions of the leg member 10 so that the bearings 42 are separated from each other in the right and left directions of the leg member 10. Thus, the combination of the shaft 40 and the pair of bearings 42 constitutes rotational supporting means for supporting the seat member 12 for rotation with respect to the leg member 10. Thus, the seat member 12 is rotatable around the shaft 40 between a substantially horizontal seating position, indicated by a solid line in FIG. 4, and an inclined position at which its rear end portion is located below the seating position and its front end portion is located above the seating position as indicated by a two-dot chain line in FIG. 4. A sector gear 44 is fixed to the lower surface of the seat member 12 so as to be arranged coaxially with the shaft 40. The gear 44 is in mesh with a rotational force transmitting gear 48 to which a rotational force is transmitted from an output shaft of a motor 46. The motor 46 is mounted on the leg member 10 and is selectively excited by means of a controller 50. An excitation switch of the controller 50 can be attached to each seat or set in a crew room of a transportation means to which the seat is attached.

If it is foreseen that the transportation means will be subjected to an impact force from the front side of the transportation means, for example in an accident or the like, the seated person on each seat or a crew in the crew room of the transportation means can turn on the excitation switch of the controller 50 of the motor 46, thereby causing the seat member 12 to rotate selectively from the seating position to the inclined position.

In this embodiment, the motor 46 and the sector gear 44 constitute selective rotation drive means for selectively driving the seat member 12 to rotate from the seating position toward the inclined position. The motor 46 and the sector gear 44 can also selectively drive the seat member 12 to rotate reversely from the inclined position to the seating position. Alternatively, however, the selective rotation drive means may be composed of a hydraulic or pneumatic piston-cylinder assembly, both ends of which are fixed to the lower surface of the seat member 12 and the upper surface of the leg member 10, or drive means, such as an airbag, which utilizes explosion of explosive.

[First Modification]

Figure 5:
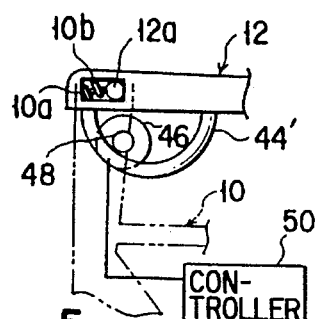
FIG. 5 is a schematic side view showing a main portion of a modification of the first embodiment in FIG. 1.

The motor 46 attached to the leg member 10 and the sector gear 44 attached to the seat member 12 can be used in the first embodiment of FIG. 1 and the second embodiment of FIGS. 2 and 3 so as to return the seat member 12 from the inclined position to the seating position. FIG. 5 shows a main portion of a modification of a first embodiment of FIG. 1, the modification being provided with a combination of the motor 46 with a sector wheel 44'. In this modification, the sector gear 44' attached to the seat member 12 movable in the back and forth directions is constructed as an internal gear, and the rotational force transmitting gear 48 is in mesh with the internal gear. Meshing of the transmitting gear 48 with the internal gear of the sector gear 44' is released when the seat member 12 is moved forward, and the transmitting gear 48 becomes in meshing with the internal gear again when the seat member 12 is moved backward. When a seated person on each of the seats or a crew in the crew room of the transportation means to which the seat is attached turns on an excitation switch (not shown) of the controller 50, the motor 46 can rotate the seat member 12 from the inclined position to the seating position by the rotational force thereof. Thus, in this embodiment, the combination of the motor 46 with the sector gear 44' constitutes seat member return driving means for driving rotation of the sear member 12 from the inclined position to the seating position.

[Second Modification]

Figure 6:
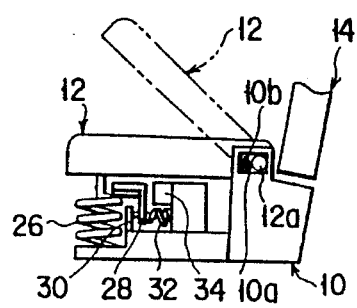
FIG. 6 is a schematic side view showing a main portion of a modification of the second embodiment in FIGS. 2 and 3.

FIG. 6 shows a modification of the second embodiment of FIGS. 2 and 3, in which the rotational center shaft 12a of the seat member 12 is arranged at the rear end portion of the seat member 12. In this modification, the same bearings 10a with the rearward urging means 10b as those used in the first embodiment are arranged at the rear end portion of the upper surface of the leg member 10 so as to function as bearings for the rotational center shaft 12a in the leg member 10. In thus modification, the seat member 12 in the inclined position moves upward its front end portion from the seating position.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A seat with user protecting means comprising:

a leg member;

a backrest member attached to the leg member so as to extend upward therefrom;

a seat member attached to the leg member so as to be rotatable between a seating position in which the seat member is arranged substantially horizontally and an inclined position in which at least a rear end portion of the seat member located on a backrest side of the leg member is arranged below a front end portion of the seat member located opposite to the rear end portion thereof and seat member rotation means for holding the seat member in the seating position and allowing the seat member to rotate selectively from the seating position to the inclined position, said seat member rotation means including:

rotational supporting means interposed between the seat member and the leg member at a position being located ahead of the rear end portion of the seat member, supporting the seat member so as to be rotatable between the seating position and the inclined position with respect to the leg member, and allowing the seat member to move in back and forth directions of the seat with respect to the leg member;

rearward urging means interposed between the seat member and the leg member and urging the seat member in a backward direction of the seat with respect to the leg member; and seating position retaining means adapted to engage with the rear end portion of the seat member in the seating position, thereby holding the seat member in the seating position, and to be disengaged from the rear end portion of the seat member, thereby allowing the seat member to move from the seating position to the inclined position, when an impact force is applied to the seat and the seat member moves forward for a predetermined distance by the force of inertia against the urging force of the rearward urging means.

2. A seat with user protecting means comprising: a leg member;

a backrest member attached to the leg member so as to extend upward therefrom;

a seat member attached to the leg member so as to be rotatable between a seating position in which the seat member is arranged substantially horizontally and an inclined position in which at least a rear end portion of the seat member located on a backrest side of the leg member is arranged below a front end portion of the seat member located opposite to the rear end portion thereof; and seat member rotation means for holding the seat member in the seating position and allowing the seat member to rotate selectively from the seating position to the inclined position, said seat member rotation means including:

rotational supporting means interposed between the seat member and the leg member at a position set back from the front end portion of the seat member, supporting the seat member so as to be rotatable with respect to the leg member, and allowing the seat member to move in back and forth directions of the seat with respect to the leg member;

rearward urging means interposed between the seat member and the leg member and urging the seat member in a backward direction of the seat with respect to the leg member;

rotational urging means interposed between the seat member and the leg member at a position located between the front end portion of the seat member and a rotation center of the seat member with respect to the leg member; and seating position retaining means adapted to engage with one of the seat member in the seating position and the rotational urging means, thereby holding the seat member in the seating position, and to be disengaged with one of the seat member in the seating position and the rotational urging means, thereby allowing the seat member to rotate from the seating position to the inclined position by the urging force of the rotational urging means, when an impact force is applied to the seat and the seat member moves forward for a predetermined distance by the force of inertia against the urging force of the rearward urging means.

3. A seat with user protecting means according to claim 2, wherein the seating position retaining means includes:

an engaging member movable between a rotation preventing position in which the engaging member engages with one of the rotational urging means and the seat member when the seat member is located in the seating position, thereby preventing the seat member from rotating from the seating position to the inclined position by the urging force of the rotational urging means, and a rotation allowing position in which the engaging member is disengaged from one of the rotational urging means and the seat member, thereby allowing the seat member to be rotated from the seating position to the inclined position by the urging force of the rotational urging means; and the seat with user protecting means further comprising engaging member selective moving means for selectively moving the engaging member from the rotation preventing position to the rotation allowing position.

4. A seat with user protecting means according to claim 2, further comprising seat member return driving means for driving a rotational movement of the seat member from the inclined position to the seating position.

* * * * *